(12) United States Patent
Stuart

(10) Patent No.: US 11,377,009 B2
(45) Date of Patent: Jul. 5, 2022

(54) STEERING WHEEL DESK

(71) Applicant: Gary Bradford Stuart, Nanton (CA)

(72) Inventor: Gary Bradford Stuart, Nanton (CA)

(*) Notice: Subject to any disclaimer, the term of this patent is extended or adjusted under 35 U.S.C. 154(b) by 342 days.

(21) Appl. No.: 16/745,963

(22) Filed: Jan. 17, 2020

(65) Prior Publication Data
US 2021/0221271 A1 Jul. 22, 2021

(51) Int. Cl.
B60N 3/00 (2006.01)
B60R 11/02 (2006.01)
B60R 11/00 (2006.01)

(52) U.S. Cl.
CPC .......... B60N 3/005 (2013.01); B60R 11/0241 (2013.01); B60R 2011/001 (2013.01)

(58) Field of Classification Search
CPC ......... A47B 31/06; B60N 3/004; B60N 3/005
USPC .......................................................... 108/44
See application file for complete search history.

(56) References Cited

U.S. PATENT DOCUMENTS

| 4,805,867 | A | * | 2/1989 | McAllister | B60N 3/005 248/441.1 |
| 4,915,035 | A | * | 4/1990 | Clark | B60N 3/005 D6/406.3 |
| 4,974,805 | A | | 12/1990 | Douglas | |
| 5,060,581 | A | * | 10/1991 | Malinski | B60N 3/005 248/441.1 |
| 5,085,153 | A | * | 2/1992 | McKee | B60N 3/002 108/44 |
| 5,749,305 | A | | 5/1998 | Jacovelli | |
| 5,845,585 | A | * | 12/1998 | Meeus | B60N 3/005 108/165 |
| 5,845,858 | A | | 12/1998 | Meeus et al. | |
| 6,036,158 | A | | 3/2000 | Raasch | |
| 6,062,145 | A | * | 5/2000 | Lin | B60N 3/005 108/44 |
| 6,408,769 | B1 | * | 6/2002 | Lewis | B60N 3/005 108/9 |
| 6,412,425 | B1 | | 7/2002 | Chen | |
| 6,457,421 | B1 | * | 10/2002 | Apichom | B60N 3/005 108/44 |
| 6,494,148 | B1 | * | 12/2002 | Mullaney | B60N 3/005 108/47 |
| 7,017,878 | B2 | * | 3/2006 | Guo | B60N 3/005 224/276 |
| 7,114,452 | B1 | * | 10/2006 | Owen | B63B 17/00 108/44 |
| 8,327,774 | B1 | | 12/2012 | Rivera | |
| D725,013 | S | * | 3/2015 | Salinas | D12/177 |
| 9,021,963 | B1 | | 5/2015 | Jacobsen | |
| 9,333,925 | B2 | * | 5/2016 | Wright | B60R 11/02 |
| D925,671 | S | * | 7/2021 | Hadlock | D21/694 |
| 2001/0030272 | A1 | * | 10/2001 | Moore | G06F 1/1611 248/441.1 |

(Continued)

Primary Examiner — Jose V Chen
(74) Attorney, Agent, or Firm — Stratford Group Ltd.

(57) ABSTRACT

A steering wheel desk comprising a single unit desk, the desk having an opening near top center of the desk, the opening shaped to allow for inserting the desk over a top portion of a steering wheel through the opening positioning the desk at an incline relative to the steering wheel, the opening having a center groove, the incline being ergonomically beneficial for a user employing the desk and the incline and the center groove preventing the user from accidentally activating a horn built into the steering wheel.

9 Claims, 3 Drawing Sheets

(56) References Cited

U.S. PATENT DOCUMENTS

| | | | |
|---|---|---|---|
| 2002/0073899 A1* | 6/2002 | Chen | B60N 3/005 |
| | | | 224/276 |
| 2004/0083930 A1 | 5/2004 | Han | |
| 2006/0032410 A1* | 2/2006 | Miller | B60N 3/005 |
| | | | 108/44 |
| 2006/0107878 A1 | 5/2006 | Cassata | |
| 2006/0175520 A1* | 8/2006 | Cooper | B60N 3/005 |
| | | | 248/444 |
| 2009/0084291 A1* | 4/2009 | Long | B60N 3/005 |
| | | | 108/44 |
| 2012/0018472 A1 | 1/2012 | Totani | |
| 2016/0274674 A1* | 9/2016 | Valdes | B64D 11/00152 |
| 2017/0313229 A1* | 11/2017 | Isernio | B60N 2/78 |
| 2018/0304792 A1* | 10/2018 | Syrianos | B60N 3/005 |
| 2020/0017220 A1* | 1/2020 | Wanner | F16M 11/38 |
| 2020/0101885 A1* | 4/2020 | Cooper | B60R 7/04 |

* cited by examiner

STEERING WHEEL DESK

FIELD OF THE INVENTION

The present disclosure relates to a steering wheel desk, more specifically but not by way of limitation, a steering wheel desk that is composed of a single unit that fits over the top portion of an existing steering wheel and provides proper ergonomic support while employed.

BACKGROUND

Current models for portable desks lack simplicity, comfort and proper ergonomic support. For many individuals who routinely traveling from job site to job site, filing out necessary paperwork for each job can become taxing and strenuous without proper support. Poor posture while writing can lead to afflictions such as rounded shoulders, spinal dysfunction, and back and neck pain. Current methods for portable desks are often bulky, time consuming to setup and take down, and most importantly, lack the proper ergonomic support for long term use.

U.S. Pat. No. 4,974,805 A (Douglas) discloses a removable clipboard which is mounted on the steering wheel of a vehicle or boat. The clipboard has an empty slot near the top for the wheel to pass through and a flange at the bottom for supporting the bottom of the steering wheel. A clip is present near the top of the clipboard to be used as support when employing the clipboard. Shortcomings include ergonomic deficiencies due to the clipboard having to be applied at the same incline as the wheel.

U.S. Pat. No. 5,749,305 A (Jacovelli) discloses an attachable tray which is mounted on the steering wheel of a vehicle. The tray has an empty slot near the bottom for the wheel to pass through and an accompanying clip for further securing the tray to the wheel. A circular hole is present for hold beverage containers. Shortcomings include ergonomic deficiencies due to the orientation of the tray while attached to the wheel.

U.S. Pat. No. 6,036,158 A (Raasch) discloses a portable tray which is mounted on the steering wheel of a vehicle. The tray has an empty slot near the top for the wheel to pass through and accompanying side members which may extend outwardly and downwardly from the plane of the steering wheel. Shortcomings include ergonomic deficiencies due to the orientation of the tray at a higher than optimal profile on the wheel.

All documents cited herein are incorporated by reference.

There is a need for a desk that may be mounted on a steering wheel that is strong, durable, ergonomically beneficial to the user, fast and simple to use, prevents accidentally activating a car horn.

BRIEF SUMMARY

It is the object of the present invention to provide a steering wheel desk comprising a single unit desk, the desk having an opening near top center of the desk, the opening shaped to allow for inserting the desk over a top portion of a steering wheel through the opening positioning the desk at an incline relative to the steering wheel, the opening having a center groove, the incline being ergonomically beneficial for a user employing the desk and the incline and the center groove preventing the user from accidentally activating a horn built into the steering wheel.

In accordance with an embodiment of the invention, the desk is composed of fiberboard, wood or plastic.

In accordance with an embodiment of the invention, a lip is attached near bottom of the desk which is composed of fiberboard, wood or plastic.

In accordance with an embodiment of the invention, one or more light-emitting diode modules are attached to the desk.

In accordance with an embodiment of the invention, a mouse pad is attached to the desk.

In accordance with an embodiment of the invention, the desk has an opening for inserting a mobile phone.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

Figure 1:
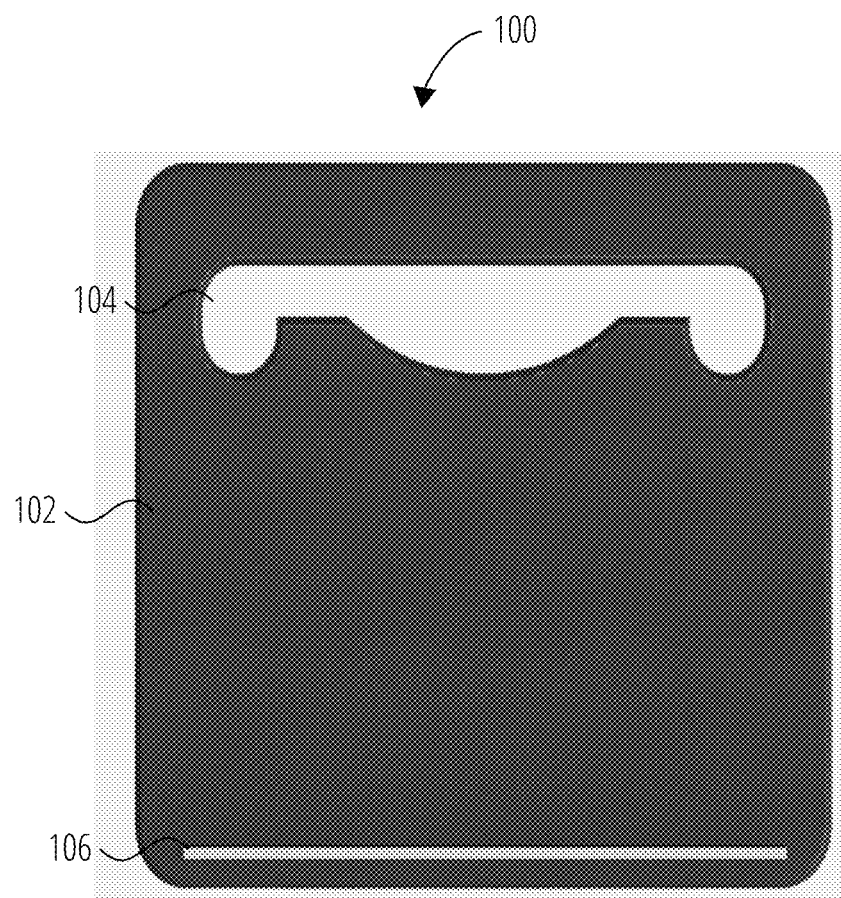
FIG. 1 illustrates a front profile 100 in accordance with one embodiment.

FIG. 1 depicts a front profile 100 of a steering wheel desk as in one embodiment. The steering wheel desk is presented as a single unit desk with the desk surface 102 shown with an opening 104 near the top center of the desk surface 102 and a lip 106 near the bottom of the desk surface 102. The steering wheel desk may be employed for such tasks as, but not limited to, writing or drawing on the desk surface 102 and operation of a laptop or tablet on the desk surface 102. The lip 106 may be utilized for further support when operating a laptop or tablet. Embodiments for the composition of the steering wheel desk include, but are not limited to, wood, plastic and fiberboard. Embodiments for the composition of the lip 106 include, but are not limited to, wood, plastic and fiberboard. In another embodiment, one or more light-emitting diode modules are attached to the desk surface 102. In another embodiment, a mouse pad is attached to the desk surface 102. In another embodiment, the desk surface 102 has an opening for inserting a mobile phone.

Figure 2:
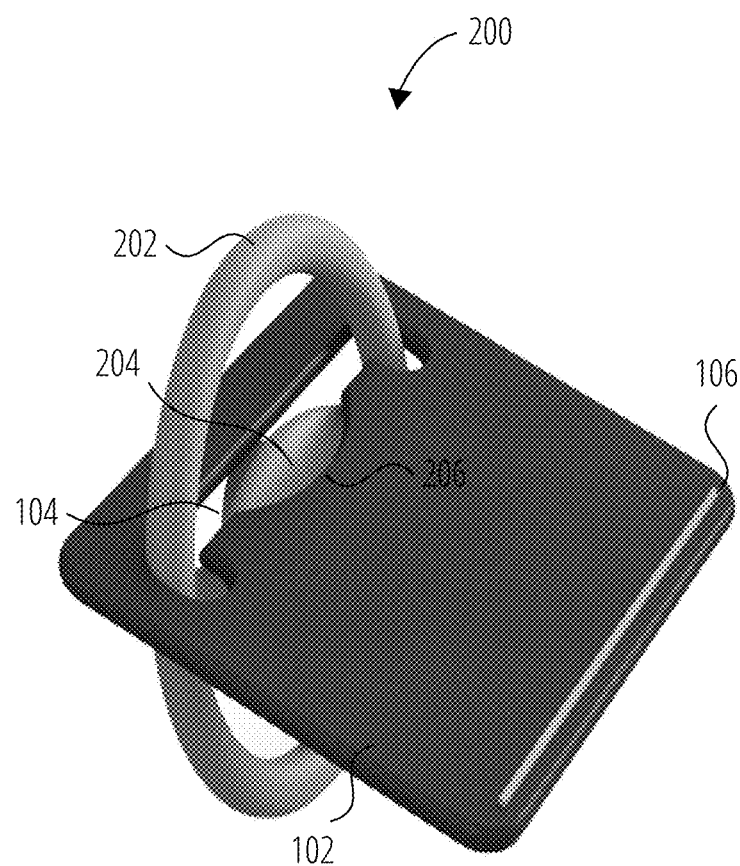
FIG. 2 illustrates an angled top view 200 in accordance with one embodiment.

FIG. 2 depicts an angled top view 200 of the steering wheel desk as in one embodiment. In this example, the steering wheel desk displayed is employed onto an existing steering wheel. The opening 104 in the desk surface 102 is shaped such that the steering wheel desk may be inserted over the top portion of the steering wheel 202, which positions the desk at an incline relative to the steering wheel 202. Additionally, a center groove 206 is shown in the opening 104 of the steering wheel desk, which in addition to the desk's orientation in reference to the steering wheel, prevents accidental activation of the horn 204 that is built into the existing steering wheel. The desk surface 102 is able to rest firmly on the steering wheel 202 at an incline which is ergonomically beneficial for a user employing the desk.

Figure 3:
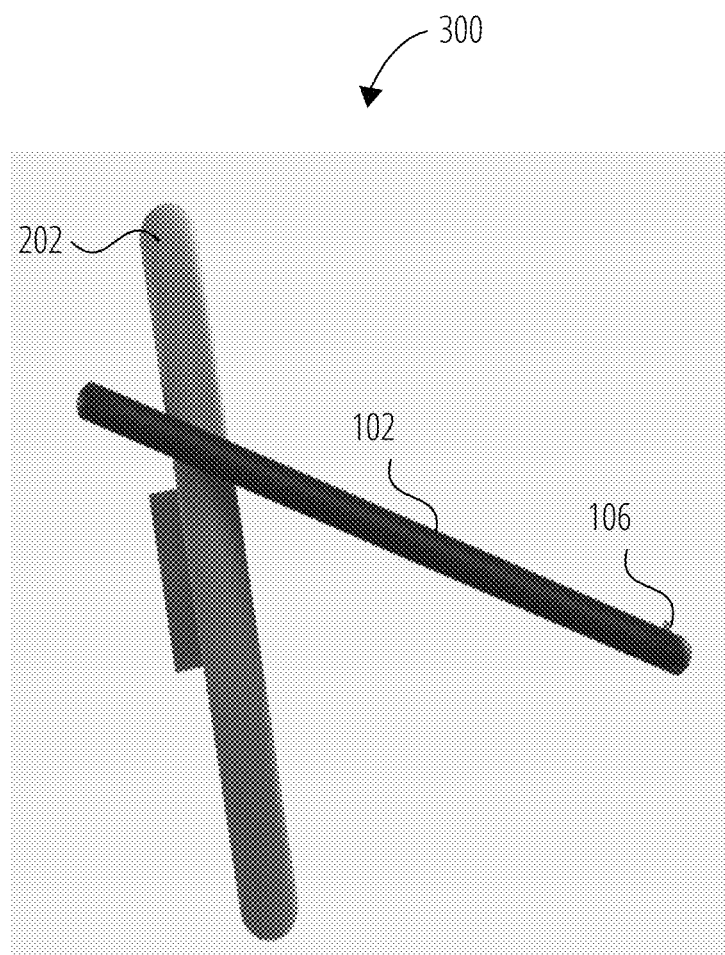
FIG. 3 illustrates a side view 300 in accordance with one embodiment.

FIG. 3 depicts a side view 300 of the steering wheel desk as in one embodiment. In this example, the steering wheel desk displayed is employed onto an existing steering wheel similar to that of FIG. 2. The desk lies on an incline while inserted over an existing steering wheel 202. The incline of the desk surface 102 allows for the user to employ the steering wheel desk from an upright position, reducing the need to hunch over and maintaining proper posture.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A steering wheel desk comprising:
   a single unit desk;
   said desk having an opening near top center of said desk;
   said opening shaped to allow for inserting said desk over a top portion of a steering wheel through said opening positioning said desk at an incline relative to said steering wheel;
   said opening having a center groove;
   said incline being ergonomically beneficial for a user employing said desk; and
   said incline and said center groove preventing said user from accidentally activating a horn built into said steering wheel.

2. The steering wheel desk of claim 1, wherein said desk is composed of fiberboard.

3. The steering wheel desk of claim 1, wherein said desk is composed of wood.

4. The steering wheel desk of claim 1, wherein said desk is composed of plastic.

5. The steering wheel desk of claim 1, wherein a lip is attached near bottom of said desk.

6. The steering wheel desk of claim 5, wherein said lip is composed of fiberboard.

7. The steering wheel desk of claim 5, wherein said lip is composed of wood.

8. The steering wheel desk of claim 5, wherein said lip is composed of plastic.

9. The steering wheel desk of claim 1, wherein one or more light-emitting diode modules are attached to said desk.

* * * * *